(12) United States Patent
McSheffrey et al.

(10) Patent No.: US 7,891,241 B2
(45) Date of Patent: *Feb. 22, 2011

(54) REMOTE FIRE EXTINGUISHER STATION INSPECTION

(75) Inventors: John J. McSheffrey, Hingham, MA (US); Brendan T. McSheffrey, Newton, MA (US)

(73) Assignee: en-Gauge, Inc., Rockland, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/504,315

(22) Filed: Jul. 16, 2009

(65) Prior Publication Data

US 2009/0282912 A1    Nov. 19, 2009

Related U.S. Application Data

(63) Continuation of application No. 11/533,581, filed on Sep. 20, 2006, now Pat. No. 7,574,911, which is a continuation of application No. 10/899,917, filed on Jul. 26, 2004, now Pat. No. 7,174,783, which is a continuation-in-part of application No. 10/024,431, filed on Dec. 18, 2001, now Pat. No. 6,766,688, and a continuation-in-part of application No. 10/782,288, filed on Feb. 19, 2004, now Pat. No. 7,174,769, which is a continuation-in-part of application No. 10/274,606, filed on Oct. 21, 2002, now Pat. No. 7,188,679, which is a continuation-in-part of application No. 09/832,531, filed on Apr. 11, 2001, now Pat. No. 6,585,055, which is a continuation-in-part of application No. 09/212,121, filed on Dec. 15, 1998, now Pat. No. 6,302,218, which is a continuation of application No. 08/879,445, filed on Jun. 20, 1997, now Pat. No. 5,848,651, which is a continuation-in-part of application No. 08/590,411, filed on Jan. 23, 1996, now Pat. No. 5,775,430, and a continuation-in-part of application No. PCT/US97/01025, filed on Jan. 23, 1997, now abandoned.

(51) Int. Cl.
*G01F 23/00*    (2006.01)
*A62C 13/76*    (2006.01)

(52) U.S. Cl. .................. 73/291; 73/37; 73/52; 169/23; 169/30; 169/57; 169/60; 169/61; 169/75; 340/611; 340/614; 340/626

(58) Field of Classification Search .................... 73/37, 73/40, 52, 290 R, 291, 865.8; 169/23, 30, 169/57, 60, 61, 75
See application file for complete search history.

(56) References Cited

U.S. PATENT DOCUMENTS 50,581 A    10/1865    Henis (Continued)

FOREIGN PATENT DOCUMENTS

DE    3 731 793    3/1989

(Continued)

OTHER PUBLICATIONS

"PCT/US02/11401) ISR", MIJA-0005-PWO.

(Continued)

*Primary Examiner*—Daniel S Larkin
(74) *Attorney, Agent, or Firm*—Strategic Patents, P.C.

(57) ABSTRACT

An apparatus for remote inspection of fire extinguishers at one or a system of fire extinguisher stations includes, e.g., at each fire extinguisher station: a detector for lack of presence of a fire extinguisher in its installed position at the fire extinguisher station; a detector for out-of-range pressure of contents of the fire extinguisher at the fire extinguisher station; a detector for an obstruction to viewing of or access to the fire extinguisher at the fire extinguisher station; and a device for transmission of inspection report information from the fire extinguisher station to a remote central station.

20 Claims, 9 Drawing Sheets

U.S. PATENT DOCUMENTS

| | | | |
|---|---|---|---|
| 558,643 A | 4/1896 | Fennessy | |
| 768,109 A | 8/1904 | Ballard et al. | |
| 922,456 A | 5/1909 | Casey | |
| 1,825,367 A | 9/1931 | Schilling | |
| 1,950,142 A | 3/1934 | Hastings et al. | |
| 2,189,991 A | 2/1940 | Muller | |
| 2,550,157 A | 4/1951 | Mazza | |
| 2,670,194 A | 2/1954 | Hansson | |
| 2,710,666 A | 6/1955 | May | |
| 2,920,641 A | 1/1960 | Girolo | |
| 3,145,375 A | 8/1964 | Webb | |
| 3,283,578 A | 11/1966 | Moore | |
| 3,333,641 A | 8/1967 | Hansom et al. | |
| 3,664,430 A | 5/1972 | Sitabkhan | |
| 3,710,613 A | 1/1973 | Innes et al. | |
| 3,735,376 A | 5/1973 | Kermer et al. | |
| 3,946,175 A | 3/1976 | Sitabkhan | |
| 3,954,612 A | 5/1976 | Wilkerson | |
| 4,003,048 A | 1/1977 | Weise | |
| 4,015,250 A | 3/1977 | Fudge | |
| 4,034,697 A | 7/1977 | Russell | |
| 4,051,467 A | 9/1977 | Galvin | |
| 4,100,537 A | 7/1978 | Carlson | |
| 4,101,887 A | 7/1978 | Osborne | |
| 4,125,084 A | 11/1978 | Salmonsen et al. | |
| 4,143,545 A | 3/1979 | Sitabkhan | |
| 4,184,377 A | 1/1980 | Hubbard | |
| 4,246,046 A | 1/1981 | Lameyer | |
| 4,279,155 A | 7/1981 | Balkanli | |
| 4,289,207 A | 9/1981 | Wernert | |
| 4,300,311 A | 11/1981 | Marchant | |
| 4,303,395 A | 12/1981 | Bower | |
| 4,342,988 A | 8/1982 | Thompson et al. | |
| 4,360,802 A | 11/1982 | Pinto | |
| 4,384,486 A | 5/1983 | Eckert | |
| 4,418,336 A | 11/1983 | Taylor | |
| 4,419,658 A | 12/1983 | Jarosz et al. | |
| 4,512,190 A | 4/1985 | Sledmere | |
| 4,531,114 A | 7/1985 | Topol et al. | |
| 4,548,274 A | 10/1985 | Simpson | |
| 4,586,383 A | 5/1986 | Blomquist | |
| 4,599,902 A | 7/1986 | Gray | |
| 4,613,851 A | 9/1986 | Hines | |
| 4,635,480 A | 1/1987 | Hrncir et al. | |
| 4,697,643 A | 10/1987 | Sassier | |
| 4,805,448 A | 2/1989 | Armell | |
| 4,823,116 A | 4/1989 | Kitchen, III et al. | |
| 4,823,788 A | 4/1989 | Smith et al. | |
| 4,835,522 A | 5/1989 | Andrejasich et al. | |
| 4,866,423 A | 9/1989 | Anderson, II et al. | |
| 4,887,291 A | 12/1989 | Stillwell | |
| 4,890,677 A | 1/1990 | Scofield | |
| 4,928,255 A | 5/1990 | Brennecke et al. | |
| 4,979,572 A | 12/1990 | Mikulec | |
| 5,020,367 A | 6/1991 | White | |
| 5,027,871 A | 7/1991 | Guenther | |
| 5,072,618 A | 12/1991 | Taylor et al. | |
| 5,123,409 A | 6/1992 | Sheffield et al. | |
| 5,124,686 A | 6/1992 | White et al. | |
| 5,153,567 A | 10/1992 | Chimento | |
| 5,224,051 A | 6/1993 | Johnson | |
| 5,305,639 A | 4/1994 | Pontefract | |
| 5,357,242 A | 10/1994 | Morgano et al. | |
| 5,460,228 A | 10/1995 | Butler | |
| 5,472,012 A | 12/1995 | Wood et al. | |
| 5,475,614 A | 12/1995 | Tofte et al. | |
| 5,479,820 A | 1/1996 | Fekete | |
| 5,486,811 A | 1/1996 | Wherle et al. | |
| 5,534,851 A | 7/1996 | Russek | |
| 5,578,933 A | 11/1996 | Nonaka | |
| 5,578,993 A | 11/1996 | Sitabkhan et al. | |
| 5,589,639 A | 12/1996 | D'Antonio et al. | |
| 5,593,426 A | 1/1997 | Morgan et al. | |
| 5,596,501 A | 1/1997 | Comer et al. | |
| 5,613,778 A | 3/1997 | Lawson | |
| 5,652,393 A | 7/1997 | Lawson | |
| 5,706,273 A | 1/1998 | Guerreri | |
| 5,775,430 A | 7/1998 | McSheffrey | |
| 5,781,108 A | 7/1998 | Jacob et al. | |
| 5,793,280 A | 8/1998 | Hincher | |
| 5,808,541 A | 9/1998 | Golden | |
| 5,816,224 A | 10/1998 | Welsh et al. | |
| 5,829,465 A | 11/1998 | Garretson | |
| 5,848,651 A | 12/1998 | McSheffrey et al. | |
| 5,853,244 A | 12/1998 | Hoff et al. | |
| 5,864,287 A | 1/1999 | Evans, Jr. et al. | |
| 5,874,899 A | 2/1999 | Barmore, Jr. et al. | |
| 5,877,426 A | 3/1999 | Hay et al. | |
| 5,936,531 A | 8/1999 | Powers | |
| 5,952,919 A | 9/1999 | Merrill | |
| 6,014,307 A | 1/2000 | Crimmins | |
| 6,114,823 A | 9/2000 | Doner et al. | |
| 6,125,940 A | 10/2000 | Oram | |
| 6,155,160 A | 12/2000 | Hochbrueckner | |
| 6,168,563 B1 | 1/2001 | Brown | |
| 6,240,365 B1 | 5/2001 | Bunn | |
| 6,270,455 B1 | 8/2001 | Brown | |
| 6,289,331 B1 | 9/2001 | Pedersen et al. | |
| 6,302,218 B1 | 10/2001 | McSheffrey et al. | |
| 6,311,779 B2 | 11/2001 | McSheffrey et al. | |
| 6,317,042 B1 | 11/2001 | Engelhorn et al. | |
| 6,336,362 B1 | 1/2002 | Duenas | |
| 6,351,689 B1 | 2/2002 | Carr et al. | |
| 6,357,292 B1 | 3/2002 | Schultz et al. | |
| 6,401,713 B1 | 6/2002 | Hill et al. | |
| 6,450,254 B1 | 9/2002 | Hoyle et al. | |
| 6,488,099 B2 | 12/2002 | McSheffrey et al. | |
| 6,496,110 B2 | 12/2002 | Peterson et al. | |
| 6,542,076 B1 | 4/2003 | Joao | |
| 6,585,055 B2 | 7/2003 | McSheffrey et al. | |
| 6,587,049 B1 | 7/2003 | Thacker | |
| 6,598,454 B2 | 7/2003 | Brazier et al. | |
| 6,646,545 B2 | 11/2003 | Bligh | |
| 6,766,688 B2 * | 7/2004 | O'Shea | 73/319 |
| 6,772,260 B2 | 8/2004 | Kawase et al. | |
| 6,856,251 B1 | 2/2005 | Tietsworth et al. | |
| 7,174,769 B2 | 2/2007 | McSheffrey et al. | |
| 7,174,783 B2 | 2/2007 | McSheffrey et al. | |
| 7,188,679 B2 | 3/2007 | McSheffrey et al. | |
| 7,450,020 B2 * | 11/2008 | McSheffrey et al. | 340/614 |
| 7,574,911 B2 * | 8/2009 | McSheffrey et al. | 73/291 |
| 2003/0071736 A1 | 4/2003 | Brazier et al. | |
| 2003/0116329 A1 | 6/2003 | McSheffrey et al. | |
| 2003/0135324 A1 | 7/2003 | Navab | |
| 2003/0189492 A1 | 10/2003 | Harvie | |
| 2010/0192695 A1 | 8/2010 | McSheffrey et al. | |

FOREIGN PATENT DOCUMENTS

| | | |
|---|---|---|
| FR | 2 340 109 | 9/1977 |
| FR | 2 515 845 | 5/1983 |
| FR | 2 676 931 | 12/1992 |
| WO | WO 81/02484 | 9/1981 |
| WO | WO 94/11853 | 5/1994 |
| WO | WO 01/46780 | 6/2001 |
| WO | WO 01/93220 | 12/2001 |
| WO | WO 03/076765 | 9/2003 |
| WO | WO 03/098908 | 11/2003 |

PUBLICATIONS

Cole-Palmer Brochure, "Exciting New Products for Measuring Flow and Pressure." Canada, received Apr. 23, 1996,1 page.
"NFPA 10 Standard for Portable Fire Extinguishers, 1998 Edition." National Fire Protection Association, pp. 10-1 thru 10-56.

Press Release, "Help That Comes Too Late Is As God As No Help At All—The Fire Extinguisher Alarm System Gives Immediate Help." Undated, *Invention Technologies, Inc.* .

* cited by examiner

REMOTE FIRE EXTINGUISHER STATION INSPECTION

PRIORITY

This application is a continuation of U.S. application Ser. No. 11/533,581, filed Sep. 20, 2006, now U.S. Pat. No. 7,574,911, which is a continuation of U.S. application Ser. No. 10/899,917, filed Jul. 26, 2004, now U.S. Pat. No. 7,174,783 issued Feb. 13, 2007, which is a continuation-in-part of U.S. application Ser. No. 10/024,431, filed Dec. 18, 2001, now U.S. Pat. No. 6,766,688, issued Jul. 27, 2004, and U.S. application Ser. No. 10/782,288, filed Feb. 19, 2004, now U.S. Pat. No. 7,174,769 issued Feb. 13, 2007, which is a continuation-in-part of U.S. application Ser. No. 10/274,606, filed Oct. 21, 2002, now U.S. Pat. No. 7,188,679 issued Mar. 13, 2007, which is a continuation-in-part of U.S. application Ser. No. 09/832,531, filed Apr. 11, 2001, now U.S. Pat. No. 6,585,055, issued Jul. 1, 2003, which is a continuation-in-part of U.S. application Ser. No. 09/212,121, filed Dec. 15, 1998, now U.S. Pat. No. 6,302,218, issued Oct. 16, 2001, which is a continuation of U.S. application Ser. No. 08/879,445, filed Jun. 20, 1997, now U.S. Pat. No. 5,848,651, issued Dec. 15, 1998, which is a continuation-in-part of U.S. application Ser. No. 08/590,411, filed Jan. 23, 1996, now U.S. Pat. No. 5,775,430, issued Jul. 7, 1998, and a continuation-in-part of International Application No. PCT/US97/01025, with an International Filing Date of Jan. 23, 1997, now abandoned, the complete disclosures of all of which are incorporated herein by reference.

BACKGROUND

Portable fire extinguishers are stationed for use in case of a fire in all manner of environments. Typically, the fire extinguishers are placed in standby condition at a system of fire extinguisher stations found throughout a facility at locations selected for reasonably easy access in a fire emergency. Standards and procedures for periodic inspection of fire extinguishers at fire extinguisher stations are set forth by the National Fire Protection Association (NFPA) in "NFPA 10 Standard for Portable Fire Extinguishers" (1998 Edition), the complete disclosure of which is incorporated herein by reference. In its relevant portion (§4-3.2), NFPA 10 sets forth the elements of the inspection of fire extinguishers and fire extinguisher stations required to take place at regular intervals, e.g., approximately every thirty days, as follows:

4-3.2 Procedures Periodic inspection of fire extinguishers shall include a check of at least the following items:
 (a) Location in designated place
 (b) No obstruction to access or visibility
 (c) Operating instructions on nameplate legible and facing outward
 (d) Safety seals and tamper indicators not broken or missing
 (e) Fullness determined by weighing or "hefting"
 (f) Examination for obvious physical damage, corrosion, leakage, or clogged nozzle
 (g) Pressure gauge reading or indicator in the operable range or position
 (h) Condition of tires, wheels, carriage, hose, and nozzle checked (for wheeled units) [not relevant]
 (i) HMIS ["hazardous materials identification systems"] label in place Typically, these inspections are performed manually, and inspection of fire extinguishers at a system of fire extinguisher stations located throughout a facility, e.g., such as a manufacturing plant or an office complex, or throughout an institution, e.g., such as a school campus or a hospital, may occupy one or more employees on a full time basis. Procedures for more frequent inspections are generally considered cost prohibitive, even where it is recognized that a problem of numbers of missing or non-functioning fire extinguishers may not be addressed for days or even weeks at a time, even where manpower may otherwise be available.

SUMMARY

According to one aspect of the invention, an apparatus for remote inspection of portable fire extinguishers at one or a system of fire extinguisher stations comprises: a fire extinguisher gauge mounted to a portable fire extinguisher comprising a fire extinguisher tank defining a volume containing fire extinguishing material and disposed in communication with the volume for detection and display of pressure condition of the fire extinguishing material contained within the volume of the fire extinguisher tank; a docking station mounted in the vicinity of and in communication with the fire extinguisher; and an electronic circuit disposed in communication with the fire extinguisher and with the docking station and adapted to signal to a remote central station upon detection of predetermined conditions comprising at least one predetermined internal condition, e.g., an out-of-range pressure condition of fire extinguishing material contained within the volume of the fire extinguisher tank of the fire extinguisher at the fire extinguisher station, and a detector therefore, and at least one predetermined external condition, e.g., lack of presence of a fire extinguisher in its installed position at the fire extinguisher station, and a detector therefore, and/or presence of an obstruction to viewing of or access to the fire extinguisher station, and a detector therefore.

Preferred embodiments of this aspect of the invention may include a detector for movement (other than removal) of the fire extinguisher relative to its installed position at the fire extinguisher station to dislodge engagement of the tether.

According to another aspect of the invention, an apparatus for remote inspection of portable fire extinguishers at one or a system of fire extinguisher stations comprises: a fire extinguisher gauge mounted to a portable fire extinguisher comprising a fire extinguisher tank defining a volume containing fire extinguishing material and disposed in communication with the volume for detection and display of pressure condition of the fire extinguishing material contained within the volume of the fire extinguisher tank; a docking station mounted in the vicinity of and in communication with the fire extinguisher; and an electronic circuit disposed in communication with the fire extinguisher and the docking station and adapted to signal to a remote central station upon detection of predetermined conditions comprising at least one predetermined internal condition, e.g., an out-of-range pressure condition of fire extinguishing material contained within the volume of the fire extinguisher tank of the fire extinguisher at the fire extinguisher station, and the at least one predetermined external condition, e.g., lack of presence of a fire extinguisher in its installed position at the fire extinguisher station and/or presence of an obstruction to viewing of or access to the fire extinguisher station.

Preferred embodiments of this aspect of the invention may include one or more of the following additional features. The electronic circuit comprises at least one detector for the at least one predetermined internal condition, the at least one detector for the at least one predetermined internal condition being adapted to initiate a signal to the remote central station upon detection of the at least one predetermined internal condition. Preferably, the at least one detector for the at least one predetermined internal condition comprises the fire extinguisher gauge for detecting the out-of-range pressure condition of fire extinguishing material contained within the volume of the fire extinguisher tank at the fire extinguisher station. More preferably, the fire extinguisher gauge comprises a gauge pointer and a gauge scale, the gauge pointer being moveable relative to the gauge scale for indication of pressure, and the apparatus further comprises a magnet mounted to the gauge pointer and at least one sensor, e.g., a Hall Effect sensor responsive to proximity of the magnet as the tank approaches an out-of-range pressure condition. Preferably, the out-of-range pressure condition comprises a low-pressure condition and/or a high-pressure condition, and the at least one sensor comprises at least one Hall Effect sensor positioned to detect the low-pressure condition and/or at least one Hall Effect sensor positioned to detect the high-pressure condition. The Hall Effect sensor is mounted generally in a plane of the gauge scale, e.g., at a rear surface of the gauge scale. The electronic circuit comprises at least one detector for the at least one predetermined external condition, the detector being adapted to initiate a signal to the remote central station upon detection of the at least one predetermined external condition. Preferably, the at least one predetermined external condition comprises movement and/or removal of the fire extinguisher relative to its installed position at the fire extinguisher station. The at least one predetermined external condition comprises presence of an obstruction to viewing of or access to the fire extinguisher station. The obstruction is disposed within a range of about 6 inches to about 10 feet from the fire extinguisher station. The at least one detector for the at least one predetermined external condition comprises a proximity sensor, e.g., comprising a sound wave emitter and a sound wave detector. Preferably, the proximity sensor comprises an ultrasonic transducer. The docking station comprises at least one detector for the at least one predetermined external condition comprising an electronic tether engaged and in electronic communication between the docking station and the fire extinguisher, and movement of the fire extinguisher relative to its installed position at the fire extinguisher station dislodges engagement of the tether and severs electronic communication, to initiate a signal to the remote central station indicative of the at least one predetermined external condition comprising lack of presence of the fire extinguisher in its installed position at the fire extinguisher station. Preferably, movement of the fire extinguisher relative to its installed position at the fire extinguisher station to dislodge engagement of the tether comprises removal of the fire extinguisher from its installed position. The at least one predetermined external condition comprises at least lack of presence of a fire extinguisher in its installed position at the fire extinguisher station and presence of an obstruction to viewing of or access to the fire extinguisher station. The at least one detector for detecting the at least one predetermined internal condition comprises the fire extinguisher gauge for detecting the out-of-range pressure condition of fire extinguishing material contained within the volume of the fire extinguisher tank of the fire extinguisher at the fire extinguisher station. The at least one detector for the at least one predetermined external condition comprises a proximity sensor. The docking station comprises at least one detector for the at least one predetermined external condition comprising an electronic tether engaged and in electronic communication between the docking station and the fire extinguisher, and movement of the fire extinguisher relative to its installed position at the fire extinguisher station dislodges engagement of the tether and severs electronic communication, to initiate a signal to the remote central station indicative of the at least one predetermined external condition comprising lack of presence of the fire extinguisher in its installed position at the fire extinguisher station. The electronic circuit comprises male and female electrical/communication connector elements cooperatively defined by the fire extinguisher and the docking station. The apparatus for remote inspection further comprises a bracket for mounting the fire extinguisher to a support and positioning the fire extinguisher relative to the docking station in an installed position for cooperative mating engagement of the male and female electrical/communication connector elements. The electronic circuit is further adapted to issue a signal to the remote central station and to receive a signal from the remote central station. The electronic circuit comprises an electronic signal means and the electronic circuit is adapted to issue an electronic signal. The electronic circuit comprises an electronic signal receiver for receiving an electronic signal from the remote central station source. The electronic circuit is adapted to issue an audio signal. The electronic circuit comprises an RF antenna and RF signal means, and the electronic circuit is adapted to issue an RF signal. The electronic circuit comprises an RF signal receiver for receiving an RF signal from the remote central station. The fire extinguisher tank further defines a fire extinguisher tank outlet; the at least one portable fire extinguisher further comprises a fire extinguisher valve assembly mounted at the fire extinguisher tank outlet; and the fire extinguisher valve assembly comprises: a fire extinguisher valve housing, a fire extinguisher valve disposed relative to the fire extinguisher tank outlet for metering release of the fire extinguishing material from the volume, and a fire extinguisher valve trigger mounted for movement of the fire extinguisher valve between a first position for containing the fire extinguishing material within the volume and a second position for metering release of the fire extinguishing material.

According to another aspect of the invention, an apparatus for remote inspection of portable fire extinguishers at one or a system of fire extinguisher stations comprises: means for detecting lack of presence of a fire extinguisher in its installed position at the fire extinguisher station; means for detecting out-of-range pressure of contents of the fire extinguisher at the fire extinguisher station; means for detecting an obstruction to viewing of or access to the fire extinguisher at the fire extinguisher station; and means for signaling inspection report information from the fire extinguisher station to a remote central station.

Preferred embodiments of this aspect of the invention may include the following additional feature. The apparatus for remote inspection further comprises means for maintaining a record of inspection report information for the fire extinguisher station or system of fire extinguisher stations.

The invention thus provides an apparatus for remote inspection of fire extinguishers at one or a system of fire extinguisher stations, permitting at least more frequent, and, if desired, continuous, monitoring and inspection of fire extinguishers at fire extinguisher stations. The apparatus for remote inspection of the invention thus makes it possible to meet, or even to far exceed, all applicable requirements of NFPA 10, typically at a comparable, or even a reduced, cost, as follows:

4-3.2 Procedures Periodic inspection of fire extinguishers shall include a check of at least the following items:

(a) Location in designated place: The apparatus of the invention for remote inspection of fire extinguishers and fire extinguisher stations communicates to a central station and confirms the presence of a fire extinguisher at each fire extinguisher station (surveillance 24 hours per day, if desired).

(b) No obstruction to access or visibility: The apparatus of the invention for remote inspection of fire extinguishers and fire extinguisher stations indicates obstructions by sensing objects, e.g., from about 6 inches to about 10 feet, in front of the monitored fire extinguisher station (surveillance 24 hours per day, if desired).

(c) Operating instructions on nameplate legible and facing outward: Once a fire extinguisher is installed at the fire extinguisher station by a fire extinguisher professional, the presence of the fire extinguisher is monitored by the apparatus of the invention for remote inspection of fire extinguishers and fire extinguisher stations. Monitoring is by means of an electronic tether that separates if the fire extinguisher is rotated, tampered with, or removed from its position at the fire extinguisher station, by sending a signal to the central station indicating that the fire extinguisher has been moved (surveillance 24 hours per day, if desired).

(d) Safety seals and tamper indicators not broken or missing: Safety seals and tamper indicators are a concern if there is a discharge of the fire extinguisher. The apparatus of the invention for remote inspection of fire extinguishers and fire extinguisher stations senses if the fire extinguisher is moved from the fire extinguisher station. It also electronically monitors pressure of the fire extinguisher tank contents, so if there is a discharge, the lower pressure resulting from the discharge is detected and reported to the central station (surveillance 24 hours per day, if desired).

(e) Fullness determined by weighing or "hefting": Once a fire extinguisher is installed by a fire extinguisher professional, the electronic tether of the apparatus of the invention for remote inspection of fire extinguishers and fire extinguisher stations indicates if the fire extinguisher is moved at or dislodged from its original installed position at the fire extinguisher station (surveillance 24 hours per day, if desired).

(f) Examination for obvious physical damage, corrosion, leakage, or clogged nozzle: Leakage is indicated by the apparatus of the invention for remote inspection of fire extinguishers and fire extinguisher stations through electronic monitoring of pressure by means of the pressure gauge of the fire extinguisher at the fire extinguisher station. A clogged nozzle results only from a discharge, which is detected from a loss of pressure (via electronic monitoring of pressure via the fire extinguisher pressure gauge) and reported to the central station through the remote inspection apparatus. Corrosion, which occurs slowly, is detected during the annual physical inspection. The remote inspection apparatus software may be programmed to issue a signal to the central station when the annual physical inspection is due, and it may also be programmed to issue notices and reminders for other types of maintenance, as required.

(g) Pressure gauge reading or indicator in the operable range or position: The apparatus of the invention for remote inspection of fire extinguishers and fire extinguisher stations electronically monitors the internal pressure of the contents of the fire extinguisher, as indicated by the pressure gauge, and reports to the central station if the pressure is not within the predetermined range (surveillance 24 hours per day, if desired).

(h) Condition of tires, wheels, carriage, hose, and nozzle checked (for wheeled units): Not applicable.

(i) HMIS label in place: Once a fire extinguisher is installed at a fire extinguisher station by a fire extinguisher professional, the fire extinguisher is monitored through the electronic tether of the apparatus of the invention for remote inspection of fire extinguishers and fire extinguisher stations, which is designed to separate and issue a signal if the fire extinguisher is rotated, tampered with, or removed from its position (surveillance 24 hours per day, if desired).

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
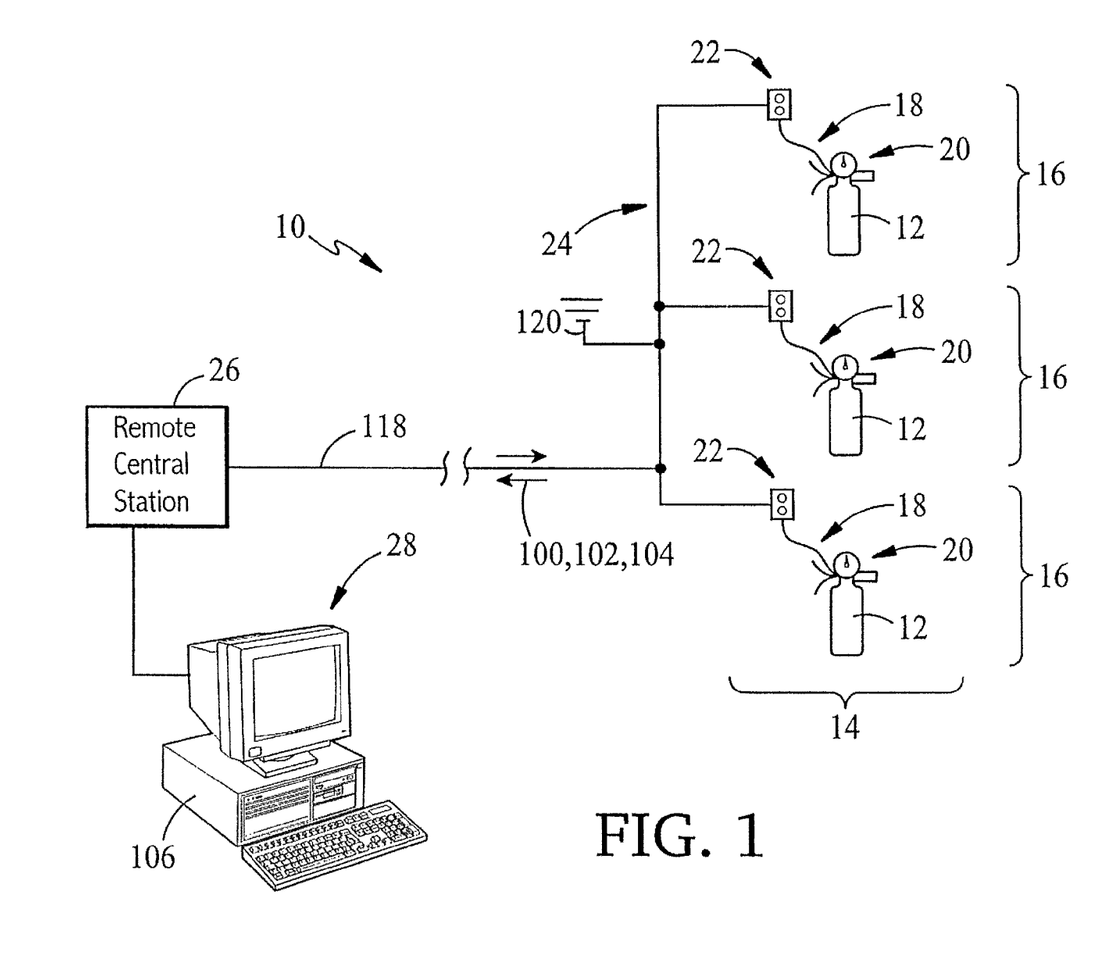
FIG. 1 is a somewhat diagrammatic view of an apparatus of the invention for remote inspection of fire extinguishers at a system of fire extinguisher stations.

Referring to FIG. 1, an apparatus 10 of the invention for remote inspection of portable fire extinguishers 12 installed at one or a system 14 of fire extinguisher stations 16 includes means 18 for detecting lack of presence of a fire extinguisher 12 in its installed position at a fire extinguisher station 16, means 20 for detecting out-of-range pressure of the contents of a fire extinguisher 12 at a fire extinguisher station 16, means 22 for detecting an obstruction to viewing of or access to a fire extinguisher station 16, and means 24 for transmission of inspection report information for each of the fire extinguisher stations 16 to a remote central station 26. The apparatus 10 further includes means 28 for maintaining a record of inspection report information.

Figure 2:
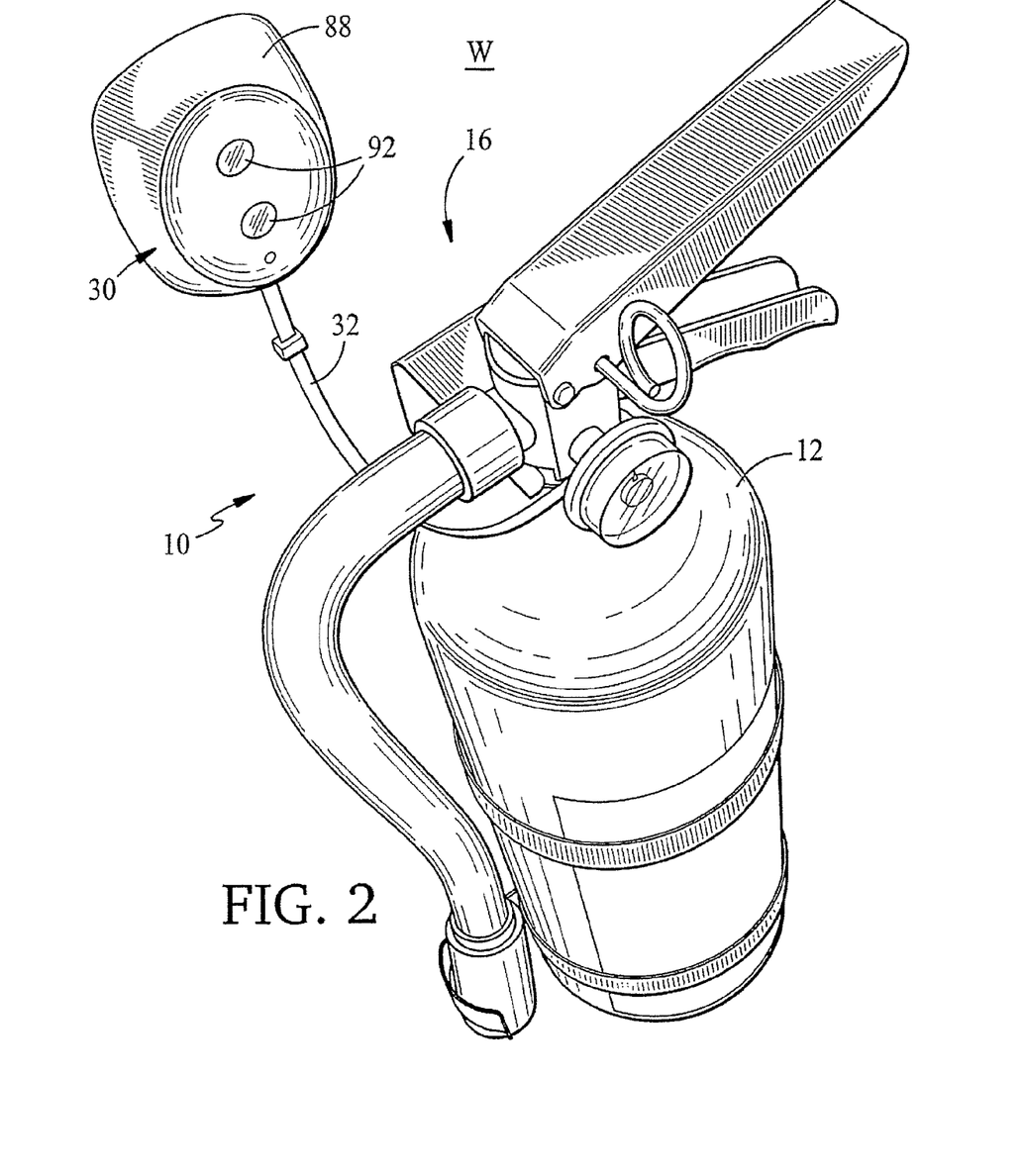
FIG. 2 is a perspective view of a fire extinguisher mounted at a fire extinguisher station for remote inspection according to the invention.
Figure 3:
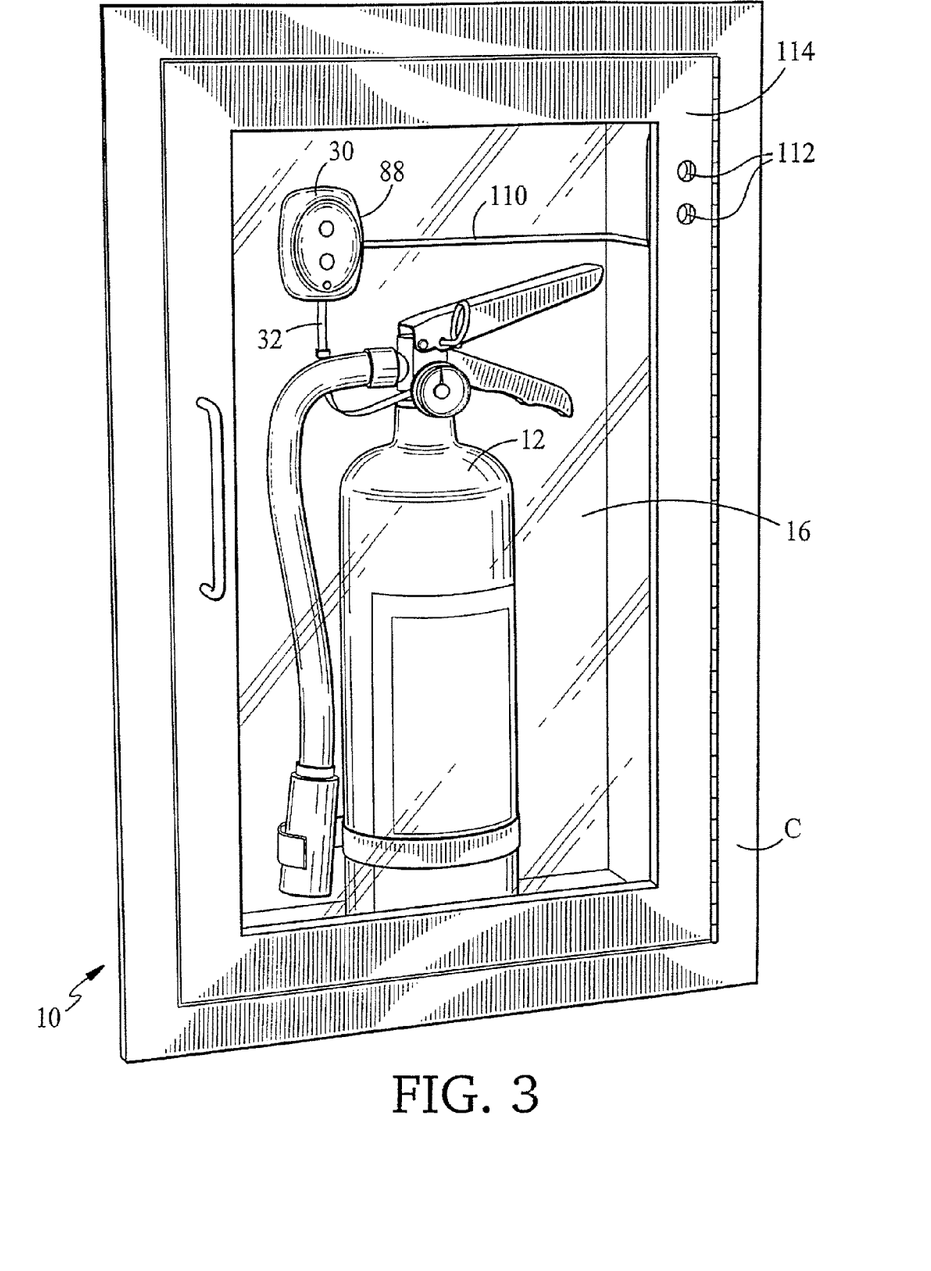
FIG. 3 is a perspective view of a fire extinguisher mounted at another fire extinguisher station for remote inspection according to the invention.
Figure 4:
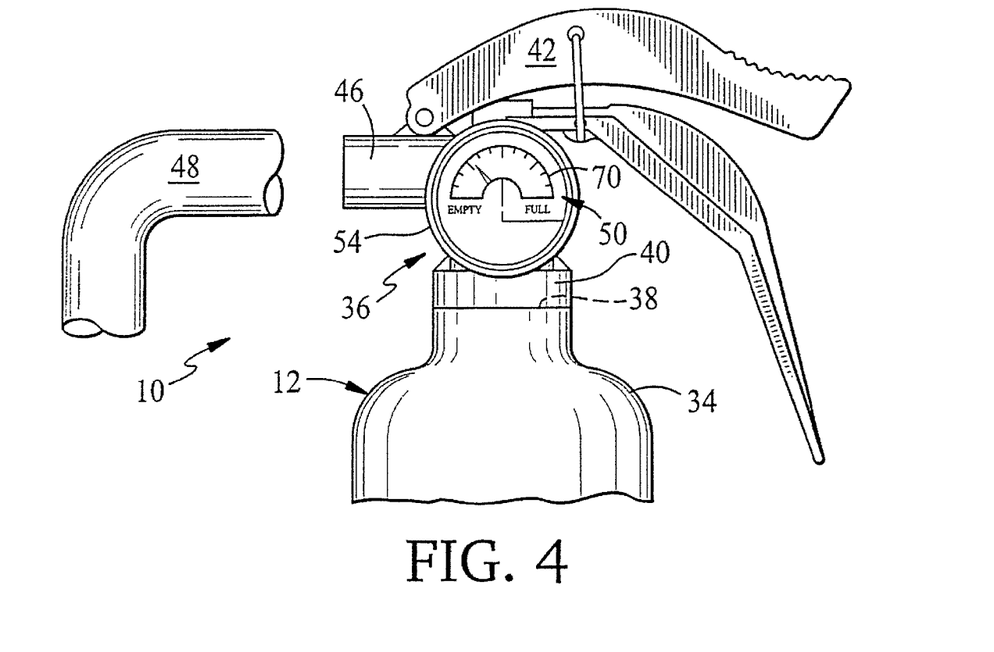
FIG. 4 is a front elevational view of a fire extinguisher at a fire extinguisher station in a remote inspection apparatus of the invention.
Figure 5:
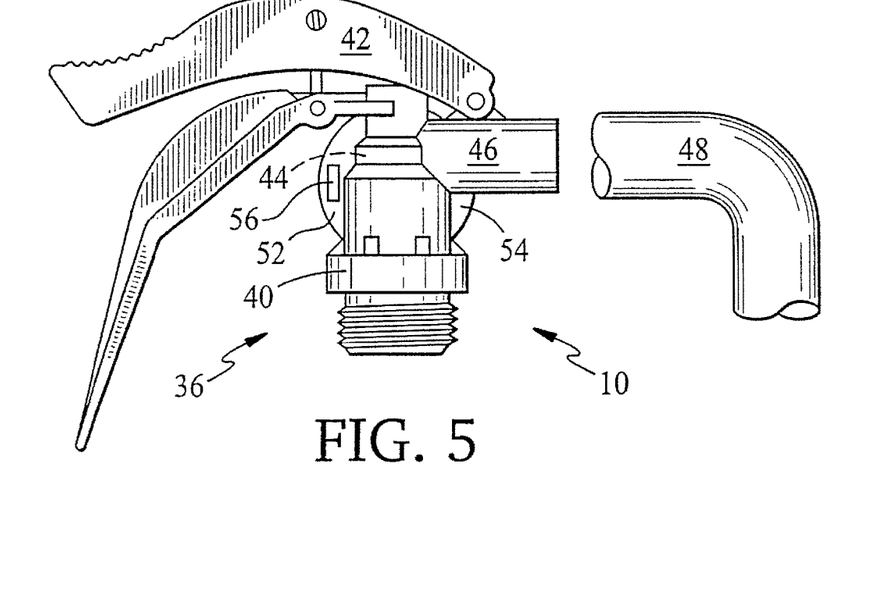
FIG. 5 is a rear elevational view of the fire extinguisher valve assembly of the fire extinguisher of FIG. 4.
Figure 6:
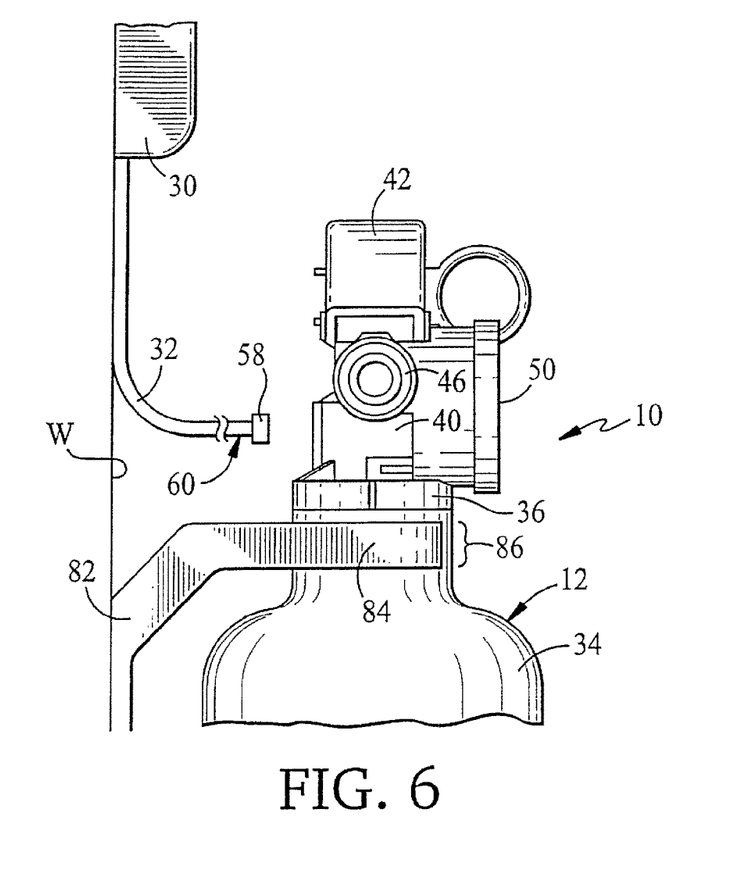
FIG. 6 is a side elevational view of the fire extinguisher valve assembly of FIG. 4.
Figure 7:
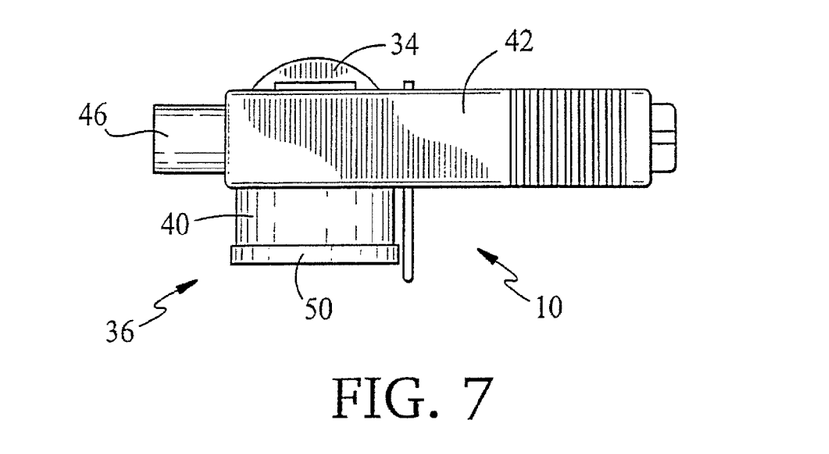
FIG. 7 is a top plan view of the fire extinguisher valve assembly of FIG. 4.

As an example of a remote inspection apparatus 10 of the invention, in FIG. 2, a portable fire extinguisher 12 is shown mounted to a wall, post, or other support surface, W, at a fire extinguisher station 16 in a system of fire extinguisher stations 14, and in FIG. 3, another portable fire extinguisher 12 is shown mounted within a wall box or cabinet, C, at another fire extinguisher station 16 in the system of fire extinguisher stations 14. The fire extinguisher 12 at each fire extinguisher station 16 is releasably connected to a docking station 30 by an electronics and communications tether 32, as will be described more fully below.

Referring next to FIGS. 4-7, a portable fire extinguisher 12 typically includes a fire extinguisher tank 34 containing a fire extinguishing material, e.g., water, dry chemical or gas, and a fire extinguisher valve assembly 36 (e.g. as available from MIJA Industries Inc., of Rockland, Mass.) mounted to releasably secure a tank opening 38. The valve assembly 36 includes a valve assembly body 40, e.g., an integral body formed of molded plastic, a trigger mechanism 42 for opening a valve 44 for release of fire extinguishing material, typically through a nozzle 46 (and, optionally, through a hose 48) provided to direct the released material in a desired direction, e.g., at the base of a flame. The valve assembly 36 further includes a gauge 50 (e.g., a Bourdon coiled tubing gauge of the type also available from MIJA Industries Inc.) to provide indication of the pressure status of fire extinguishing material within the fire extinguisher tank 34. The valve assembly body 40, e.g., in a rear surface 52 of the valve gauge housing 54, defines a female socket 56 receiving a male connector element 58 at the free end 60 of the tether 32 in cooperative, releasable engagement for electronics and/or communications connection between the docking station 30 and the portable fire extinguisher(s) 12 at each of the fire extinguisher stations 16, as will be described more fully below.

Figure 8:
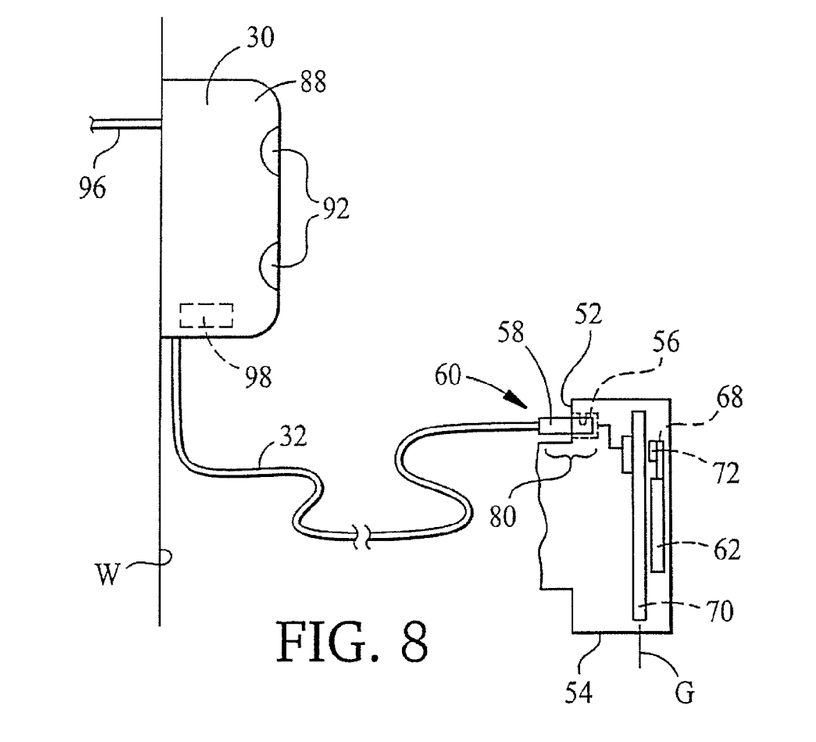
FIG. 8 is a somewhat diagrammatic side view of the valve gauge housing and docking station, with the interconnecting electronics and communications tether.
Figure 9:
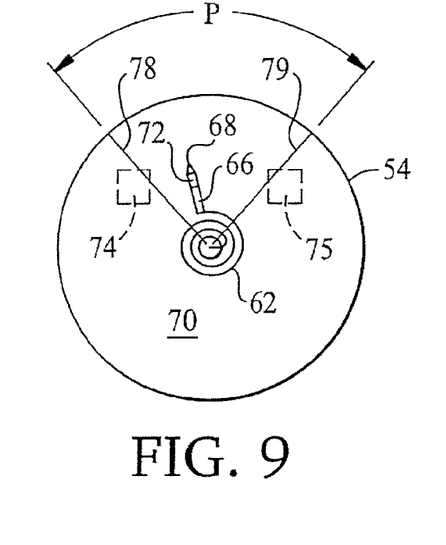
FIGS. 9 and 10 are front and rear views, respectively, of the valve gauge and valve gauge scale within the valve gauge housing of the fire extinguisher of FIG. 4.
Figure 10:
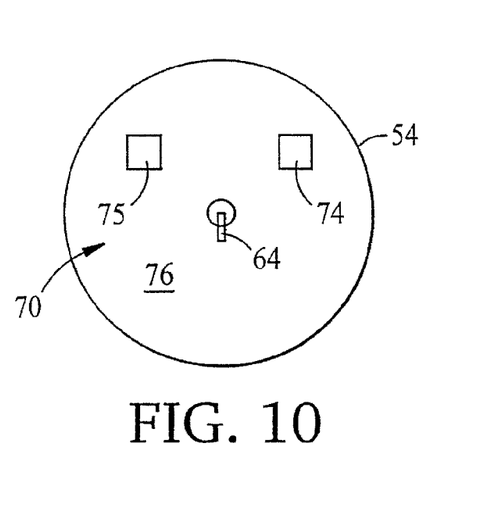

Referring next to FIGS. 8-10, as mentioned above, in the preferred embodiment, the valve gauge 50 is a Bourdon gauge formed of a coiled tubing 62, with an open inner end 64 in communication with the volume of the fire extinguisher tank 34, and a closed, outer end 66 formed into a gauge pointer 68, e.g., as described in Holden U.S. Pat. No. 4,191,056 and U.S. Pat. No. 4,667,517, the complete disclosures of which are incorporated herein by reference. After calibration, the gauge pointer 68 moves (by expansion and contraction of the coiled tubing 62 in response to tank volume pressure) relative to a gauge scale 70 to indicate pressure of the fire extinguishing material contained within the tank volume. According to the invention, the apparatus 10 includes a magnet 72 mounted to gauge pointer 68, and a Hall Effect sensor 74 mounted generally in a plane, G, of the gauge scale 70, e.g., at the rear surface 76 of the gauge scale 70, at least at the region of the gauge scale 70 corresponding to the low pressure limit 78 of the predetermined range of pressure, P. In a preferred embodiment (shown), a second Hall Effect sensor 75 is also located at the rear surface 76 of the gauge scale 70, but in a region of the gauge scale 70 corresponding to the predetermined upper pressure limit 79. Each Hall Effect sensor 74, 75 is adapted to respond to proximity of the magnet 72 mounted to the gauge pointer 68 (as the magnet 72 and gauge pointer 68 approach the low pressure limit 78 or the high pressure limit 79) by initiating a signal, through the male/female connection 80 and tether 32, to the docking station 30 and remote central station 26, indicative of out-of-range (low or high) pressure of the fire extinguishing material contained within the tank volume.

Referring again to FIG. 6, the fire extinguisher 12 may be removably mounted on a wall hanger or bracket 82 fixedly secured to a wall or other support surface, W. The bracket 82 has a pair of opposed arms 84 that releasably engage about the neck region 86 of the fire extinguisher tank 34, generally below the valve assembly body 40.

In the embodiment shown in FIG. 2, the docking station 30 is fixedly mounted to the wall, W, at a predetermined position spaced generally above the bracket 82. Referring also to FIG. 8, the docking station 30 consists of a housing 88 containing a sonar module 90 (FIG. 11) and defining spaced apertures or windows 92 through which the module 90 emits and receives ultrasonic signals. (In the embodiment of FIG. 3, where the docking station 30 is disposed with a wall cabinet, C, the sonar module 90 is connected, e.g., by cable 110, to apertures or windows 112 in the outer surface of the cabinet door 114.) Also, disposed within the docking station housing 88 is an electronic and communications circuit 94, as described more fully below with reference to FIG. 11. Extending generally from the base of the docketing station housing 88 is the electronics and communications tether 32 terminating in a male connector element 58 sized and configured to be received within the female electronics and communications socket 56 defined in the rear surface 52 of the valve gauge housing 54. The length of the tether 32, and the tenacity of engagement of the male connector element 58 within the female socket 56 at the connection 80, are preferably selected so that any significant movement of the fire extinguisher 12 relative to its installed position, i.e., the position in which it is placed at installation by a fire extinguisher professional, whether removal, or, in a preferred embodiment, merely upon rotation with movement in excess of a predetermined threshold value, will result in dislodgement of the male connector element 58 from the female socket 56, initiating a signal to the remote central station 26, as discussed more fully below. The docking station 30 may be powered by alternating current, e.g., by a hardwire connection 96 into the facility electrical supply, or it may be powered by direct current, e.g., by a battery 98 within the docking station housing 88. If powered by alternating current, an auxiliary power supply, e.g., in the form of battery 98, may be provided in case of power outage.

Figure 11:
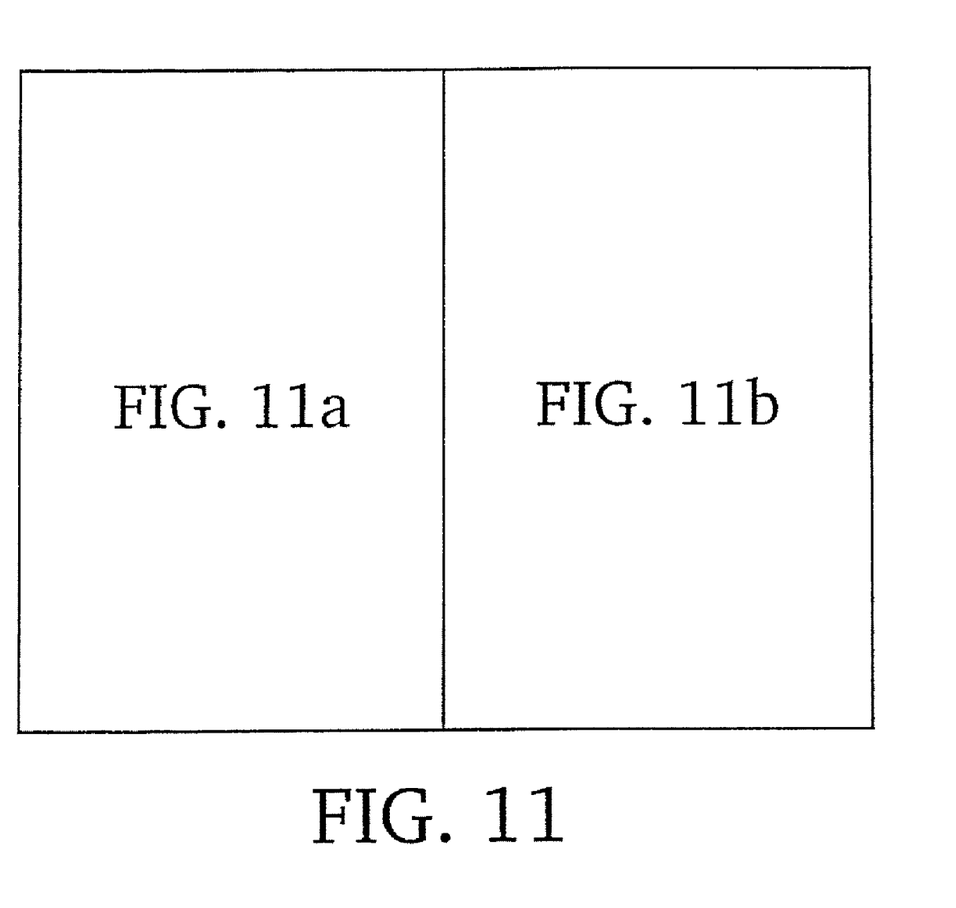
FIG. 11 is a block diagram of the electronics and communications circuit for one embodiment of a remote inspection apparatus of the invention.
Figure 11A:
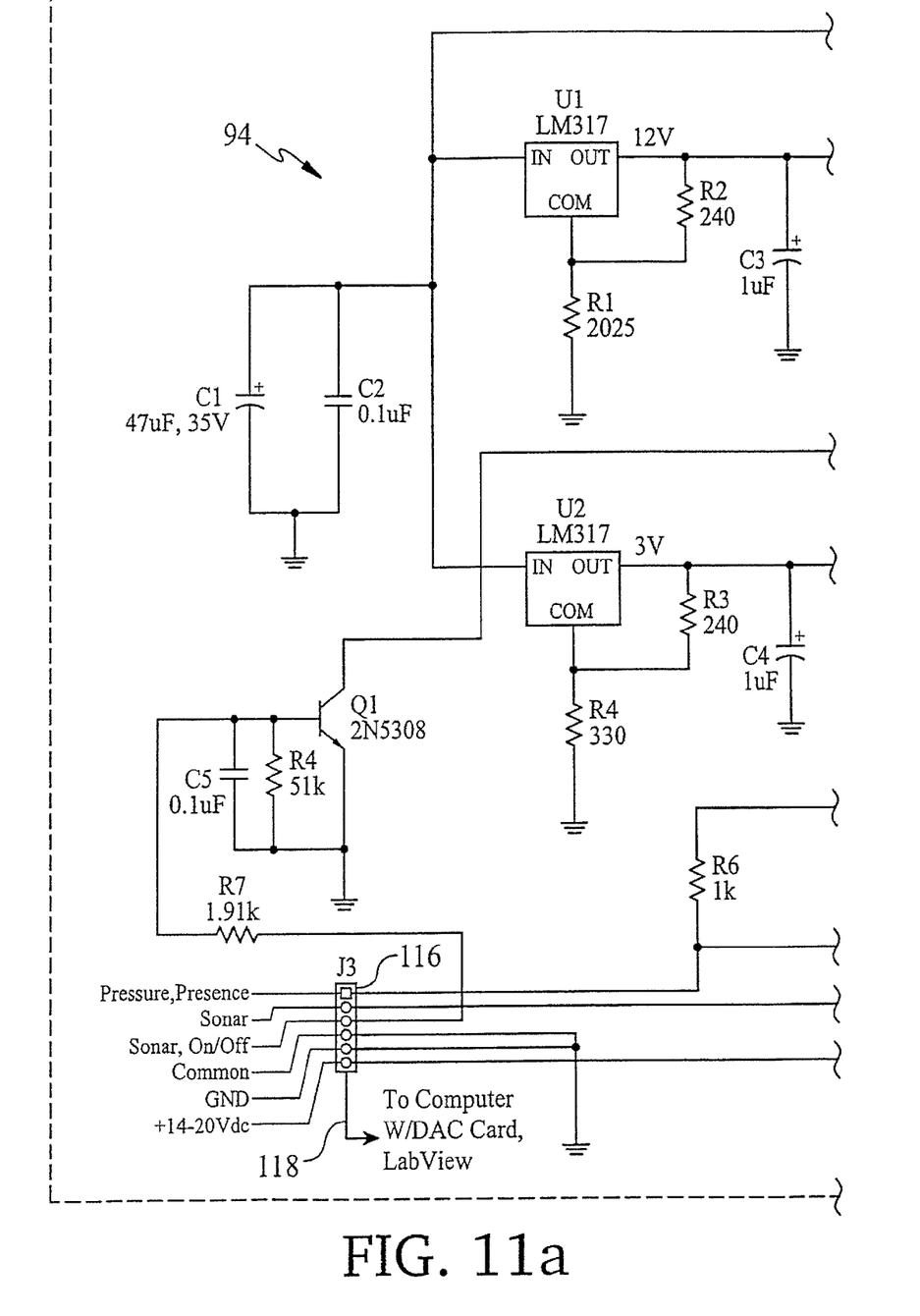
Figure 11B:
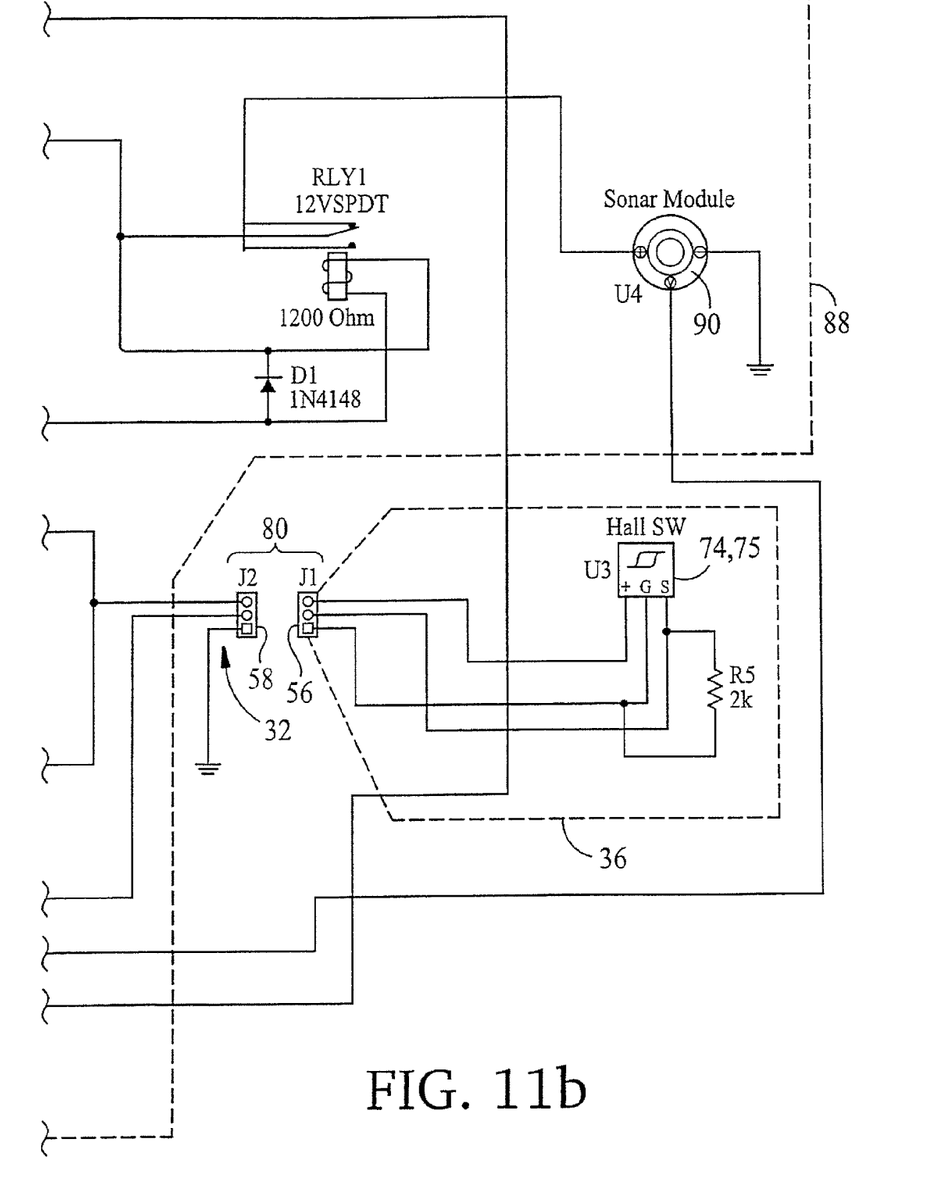

Referring now to FIG. 11, the remote inspection apparatus 10 includes an electronics and communications circuit 94, e.g., disposed primarily within the docking station 30, for initiating signals to the remote central station 26 upon detection of predetermined internal and/or predetermined external conditions. For example, referring again to FIG. 1, in the preferred embodiment, the circuit 94 issues a signal 100 or a signal 102 upon detection of a predetermined external condition, e.g., lack of presence of the fire extinguisher 12 at its installed position at the fire extinguisher station 16, when the fire extinguisher 12 is removed from, or moved within, the bracket arms 84, thereby disengaging the male connector element 58 of the docketing station tether 32 from the female socket 56 of the fire extinguisher 12, and disrupting the closed connection 80 (signal 100), or an obstruction to viewing of or access to a fire extinguisher station 16 (signal 102). The circuit 94 also issues a signal 104 upon detection of a predetermined internal condition, e.g., existence of an out-of-range, e.g., low, pressure condition of the fire extinguishing material contained within the fire extinguisher tank 34.

According to one embodiment, the signals 100, 104 are communicated via the electronics and communications connection 80 of the male connector element 58 of the docking station tether 32 with the female socket 56 of the fire extinguisher 12 to electronics and communications circuit 94 within docking station 30. The signal 100 indicating lack of presence of the fire extinguisher 12 in its installed position at the fire extinguisher station 16 and signal 104 indicating that pressure of the fire extinguishing material in the fire extinguisher tank 34 is below the predetermined minimum pressure level 78, e.g., indicative of a discharge, leak or other malfunction (or, in an embodiment with a pair of Hall Effect sensors 74, 75, above a predetermined maximum pressure level 79) are received by a connection and termination strip process control board 116 and transmitted via hardwire connection 118 to the remote central station 26. In this embodiment, the tether 32 includes a two wire connection in normally closed state, signaling the presence of the fire extinguisher 12, and a two wire connection in normally open state that signals that pressure in the fire extinguisher tank is above the predetermined minimum level 78. The signals are received and transmitted over the hardwire connection 118. However, it is contemplated that, in some embodiments, signals 100, 102, 104 may be communicated, e.g., via RF (or other) wireless communication circuitry via antennae 120 (FIG. 1) to an RF monitoring system receiver, e.g., at the remote central station 26, or simultaneously, via both hardwire and wireless, to a remote central station 26, or other monitoring station. As mentioned above, it is also contemplated that the remote inspection apparatus 10 may be powered by alternating current, e.g., by connection 96 (FIG. 8) to the facility electric supply system or by direct current, e.g. by battery 98 (FIG. 8), or by both, with the battery provided as auxiliary power in case the primary electrical service is disrupted.

Briefly, in summary, in a preferred embodiment, the means 18 for detecting the lack of presence of a fire extinguisher 12 in its installed position (i.e., as installed by a fire extinguisher professional) at a fire extinguisher station 16 includes an electronics and communications tether 32 extending from a docking station 30, with a male connector element 58 at its free end 60 releasably engaged in a female socket 56 defined by the fire extinguisher valve gauge housing 54. When the fire extinguisher 12 is removed, or, in the preferred embodiment, moved, from its installed position, the male connector element 58 at the free end 60 of the tether 32 is disengaged from the socket 56, causing issue of a signal to the remote central station 26. The means 20 for detecting out-of-range pressure includes a magnet 72 mounted to the pressure gauge pointer 68 and one or, more preferably, a pair of Hall Effect sensors 74, 75 mounted, e.g., to a rear surface 76 of the valve gauge scale 70, whereby, as the gauge pointer 68 approaches either the lower limit 78 or the upper limit 79 of its predetermined range of pressure, P, of fire extinguishing material within the tank volume, the associated Hall Effect sensor 74, 75, respectively, is triggered by proximity of the magnet 72 to issue a signal through the electronics and communications tether 32 to the docking station 30. An out-of-range pressure signal is then transmitted to the remote central station 26. The means 22 for detecting an obstruction to viewing of or access to a fire extinguisher 12 at a fire extinguisher station 16 includes a sonar module 90 mounted within (FIG. 2), or mounted in connection to (FIG. 3), the docking station 30. The sonar module 90 periodically emits an ultrasonic signal and detects when the signal is returned (reflected) by an obstruction within a predetermined region or range, e.g., from about 6 inches to about 10 feet from the docking station 30. Upon detection of an obstruction, a signal is issued to the remote central station 26.

The remote inspection information is communicated to means 28, e.g., a computer 106 (FIG. 1) located at the remote central station 26, or other location, where the information is compiled and stored for display and/or print-out in the form of periodic inspection report, e.g., to trigger corrective action.

In operation of a remote inspection apparatus 10 of the invention, a portable fire extinguisher 12 is releasably mounted, e.g., upon a bracket 82 fixedly secured to wall or other support surface, W (FIG. 2), or within a wall cabinet, C (FIG. 3), the bracket 82 having a pair of opposed arms 84 that releasably engage about the neck region 86 of the fire extinguisher tank 34, generally below the valve assembly body 40. A fire extinguisher professional, after inspection of the fire extinguisher 12 for obvious physical damage, corrosion, leakage or clogged nozzle in compliance with NFPA 10, §4-3.2(f), positions the portable fire extinguisher 12 so that the operating instructions on the fire extinguisher nameplate are legible and facing outward as required by NFPA 10, §4-3.2(c), and with its HMIS label in place as required by NFPA 10, §4-3.2(j). The male connector element 58 of the electronics and communications tether 32 is inserted into the female socket 56 defined by the valve gauge housing 54 to connect the docking station 30 and the fire extinguisher 12. As mentioned above, the length of the tether 32 is preferably predetermined so that any substantial movement of the fire extinguisher 12 relative to the docket station 30, whether removal or rotation in the bracket 82, dislodges the male connector element 58 of the tether 32 from the socket 56, with a resulting signal to the remote central station 26 indicating that the fire extinguisher 12 has been moved from its installed position at the fire extinguisher station 16 (i.e., lack of presence) as required by NFPA 10, §4-3.2(a).

If the contents of the fire extinguisher tank 34 reach a predetermined low pressure limit 78, the magnet 72 mounted to the gauge pointer 68 at the end of the Bourdon gauge coiled tubing 62 is brought into range of the Hall Effect sensor 74 mounted unobtrusively to the rear surface 76 of the valve gauge scale 70. The proximity of the magnet 72 causes the Hall Effect sensor 74 to trigger, sending a signal indicative of the out-of-range pressure condition of the fire extinguisher contents through the electronics and communications tether 32 to the docking station 30. A low pressure signal will thus issue, e.g., if there is a fire extinguisher discharge resulting in loss of fullness and reduction in weight as required by NFPA 10, §4-3.2(e), including from tampering, resulting in broken or missing safety seals or tamper indicators as required by NFPA 10, §4-3.2(d), possibly resulting in a clogged nozzle as required by NFPA 10, §4-3.2(f). Referring to FIGS. 9 and 10, a pair of Hall Effect sensors 74, 75 may be positioned at the rear surface 76 of the valve gauge scale 70 in the regions of both the low pressure limit 78 and the high pressure limit 79 of the predetermined pressure range, P, of the fire extinguisher contents, to provide a signal if the pressure passes outside of the operable range as required by NFPA 10, §4-3.2(g).

The sonar module 90 contained within the docking station 30 periodically emits an ultrasonic signal. The docking station 30 detects any return (reflected) signal indicative of the presence of an obstruction, e.g., to viewing of or access to the fire extinguisher station 16, within a predetermined range, e.g., about 6 inches to about 10 feet from the docking station 30, to issue a signal indicative of the presence of an obstruction as required by NFPA 10, §4-3.2(b).

The remote inspection apparatus 10 of the invention thus provides protection that meets or exceeds the requirements of NFPA 10, §4-3.2. Surveillance can be provided 24 hours per day, if desired.

The remote central station 26 may also send signals 122 to the fire extinguisher stations 16 to periodically check for these, and/or other, predetermined internal and external conditions.

Other means may be employed for developing an electronic signal of an out-of-range position of the pressure gauge needle or indicator. For example, an optical sensor has advantages similar to those of the Hall Effect sensors 74, 75, i.e., low cost and simplicity, with no additional modulation circuitry required to develop the measured quantity, but optical sensors typically must be shielded from extraneous light. Hall Effect sensors have a further advantage of being generally impervious to external light (which can vary according to lighting conditions); however, Hall Effect sensors can be affected by magnetic fields. Both Hall Effect and optical sensors can be operated in either digital mode, for detecting when the gauge pointer moves through a discrete arc of motion, or in linear mode, if a continuously variable measure or signal is desired (not typically required for this application). Alternatively, a pressure signal might be generated by electronic sensing, without visual indication, or by sensing of the position of the needle body or the Bourdon gauge coiled tubing, or by use of a different form of pressure sensor.

In the preferred embodiment, a non-contact ultrasonic sensor (sonar module 90) is employed for detecting the presence of an obstruction. Alternatively, a non-contact optical sensor may be employed. Both have sensitivity over wide ranges of distances (e.g., about 6 inches to about 10 feet, or other ranges as may be dictated, e.g., by environmental conditions). As an obstruction may move slowly, or may be relatively stationary, it may not be necessary to have the sensor active at all times; periodic sampling, e.g., once per hour, may be sufficient. On the other hand, the sonar module 90 of the docking station 30 may also be utilized as a proximity or motion sensor, e.g., in a security system, e.g., to issue a signal to a remote central station 26 and/or to sound an alarm when movement is detected in the vicinity of a fire extinguisher station 16 while a building is secured, e.g., after business hours or during weekends or vacations. In this case, continuous operation may be dictated, at least during periods when the security system is active. Other features and characteristics that may be optimally employed, as desired, include: wide angle and narrow angle sensitivity, digital output (Is there an obstruction or not?), and/or analog output (e.g., How large an obstruction? and How far away from the docking station?).

In the preferred embodiment, the electronics and communications tether 32 is used to determine the lack of presence of the fire extinguisher 12 in its installed position at the fire extinguisher station 16. In the preferred circuit design, an A-to-D converter in the docking station microprocessor discriminates between a valid gauge sensor signal, indicating a fire extinguisher 12 is present, and a signal indicating a missing fire extinguisher (or a disconnected tether 32). Preferably, the tether 32 is sufficiently short (relative to the distance from the docketing station 30 to the mounted fire extinguisher 12) so that any significant displacement of the fire extinguisher 12 from its installed position (either by rotation or movement in the bracket 82 or by removal) will result in disconnection of the tether 32 from the fire extinguisher 12 and a subsequent change in voltage sensed at the docking station 30. The arrangement of the present invention has the further advantage of requiring no additional power to sense the lack of presence of a fire extinguisher 12. The following alternatives are all active sensors and thus require power: non-contact, such as optical devices, or capacitive, inductive, and magnetic quantity devices in contact or non-contact applications. In other applications, e.g., to decrease the number of false alarms, the length of the tether 32 may be selected to signal only when the fire extinguisher 12 is removed from (and not merely moved at) the fire extinguisher station 16. The tether 32 may also be used only for communications between the pressure gauge 50 and the docking station 30, e.g., and not for detecting lack of presence (or movement) of the fire extinguisher 12.

A number of embodiments of the invention have been described. Nevertheless, it will be understood that various modifications may be made without departing from the spirit and scope of the invention. For example, other features that might be provided in connection with a remote inspection apparatus of the invention may include, in some instances: an electronic circuit contained on a circuit board mounted to the fire extinguisher valve assembly, e.g. beneath the gauge scale, and powered, e.g., by battery disposed within the docking station, or within a compartment defined by the fire extinguisher valve assembly body. The circuit may optionally further include an electro luminescent light panel, e.g., mounted upon the face of the valve gauge scale. In some embodiments, the electronic circuit may include the valve gauge pointer and a contact located in a region upon the face surface of the gauge scale selected for inter-engagement of the contact and the gauge pointer, e.g., when the contents of the tank are at a low-pressure condition. Interengagement of the gauge pointer and contact may optionally complete a circuit to illuminate the light panel, thereby to generate a visual signal to passersby, warning of the low-pressure condition of the fire extinguisher. In some embodiments, an electronic circuit may include a flashing unit for intermittent illumination of the light panel, thereby to better attract the attention of passersby, and also to conserve battery life. The electronic circuit additionally or instead may, in some embodiments, include a contact located in a region selected for interengagement of the contact and the gauge pointer when the contents of the tank are at a high or overcharged pressure condition. The electronic circuit may also include an audio signaling device, e.g., as part of the docking station, for emitting, e.g., a beeping sound, instead of or in addition to the visual signal. The audio signal device may be triggered when the fire extinguisher is placed in use, e.g., upon removal from the bracket. The audio signal may consist of a recorded information message, e.g., instructions for use of the fire extinguisher including the type of fire for which use is appropriate, e.g., paper, electrical, liquid, all types. The electronic circuit may also include a battery condition sensor to actuate a visual and/or audio signal, e.g., at the remote central station, when a low battery condition is detected. The electronic circuit may also include a light sensor, e.g., of ambient light conditions, to actuate illumination of the light panel in low or no light conditions, e.g., to signal the location of the fire extinguisher, or fire extinguisher station, at night or upon loss of power to external lighting. The electronic circuit may also include a sensor adapted to sense other local conditions, e.g., smoke or fire, to actuate illumination of the light panel and/or audio signal device when smoke or other indications of a fire are sensed, e.g., to signal the location of the fire extinguisher, or fire extinguisher station, when visibility is low. The electronic circuit may include a timer set to actuate the visual and/or the audio signal after a predetermined period of time, e.g., the recommended period between inspections, unless the timer is reset. The electronic circuit may be responsive to a signal from an external source, e.g., a system of smoke detectors, another fire extinguisher or fire extinguisher station, a suppression system, or the like, to actuate the visual and/or the audio signal. The electronic circuit may also include an encoded identification specific to each fire extinguisher for receiving and dispatching signals or messages, e.g., of fire extinguisher condition or local status, via the electronics and communications connection with the docking station and/or an internal RF antenna, identifiable as relating to that fire extinguisher or fire extinguisher station, to the remote central station and/or to other elements of a home or facility security system. The docking station may contain a circuit board programmed with the protocols for certain alarms or signals relating to predetermined internal and external conditions, and may include a battery for primary or auxiliary power.

A remote inspection apparatus of the invention may also be employed for remote inspection of multiple fire extinguishers at one or a system of fire extinguisher stations.

Accordingly, other embodiments are within the scope of the following claims.

What is claimed is:

1. Apparatus for remote inspection of portable tanks, said apparatus comprising:
a portable tank defining a volume;
a gauge being disposed in communication with the volume defined by the portable tank for detection and display of pressure condition of the content contained within the volume defined by the portable tank; and
an electronic circuit disposed in communication with the gauge and adapted to signal to a remote central station upon detection of predetermined conditions comprising at least one predetermined internal condition,
the at least one predetermined internal condition comprising an out-of-range pressure condition of contents contained within the volume of the portable tank, and said apparatus comprising at least one detector for the at least one predetermined internal condition comprising said gauge for detecting the out-of-range pressure condition of content contained within the volume of the portable tank.

2. The apparatus for remote inspection of claim 1, wherein the predetermined conditions further comprise at least one predetermined external condition, the at least one predetermined external condition comprising at least lack of presence of a portable tank in its installed position, or presence of an obstruction to viewing of or access to the portable tank.

3. The apparatus for remote inspection of claim 2, wherein said electronic circuit comprises at least one detector for the at least one predetermined external condition, said at least one detector for the at least one predetermined external condition being adapted to initiate a signal to the remote central station upon detection of the at least one predetermined external condition.

4. The apparatus for remote inspection of claim 3, wherein the at least one predetermined external condition comprises movement of the portable tank relative to its installed position.

5. The apparatus for remote inspection of claim 4, wherein the at least one predetermined external condition comprises removal of the portable tank from its installed position.

6. The apparatus for remote inspection of claim 3, wherein the at least one predetermined external condition comprises removal of the portable tank from its installed position.

7. The apparatus for remote inspection of claim 3, further comprising:
at least one detector for the at least one predetermined external condition comprising an electronic tether engaged and in electronic communication between the remote central station and the portable tank, and movement of the portable tank relative to its installed position dislodges engagement of said tether and severs electronic communication, to initiate a signal to the remote central station indicative of the at least one predetermined external condition comprising lack of presence of the fire extinguisher in its installed position.

8. The apparatus for remote inspection of claim 7, wherein the movement of the portable tank relative to its installed position to dislodge engagement of said tether comprises removal of the fire extinguisher from its installed position.

9. The apparatus for remote inspection of claim 1, wherein said electronic circuit comprises at least one detector for the at least one predetermined internal condition, said at least one detector for the at least one predetermined internal condition being adapted to initiate a signal to the remote central station upon detection of the at least one predetermined internal condition.

10. The apparatus for remote inspection of claim 9, wherein said at least one detector for the at least one predetermined internal condition comprises said gauge for detecting the out-of-range pressure condition of contents contained within the volume of the portable tank.

11. The apparatus for remote inspection of claim 10, wherein said gauge comprises a gauge pointer and a gauge scale, said gauge pointer being moveable relative to said gauge scale for indication of pressure, and said apparatus further comprises a magnet mounted to said gauge pointer and at least one sensor responsive to proximity of said magnet as the portable tank approaches an out-of-range pressure condition.

12. The apparatus for remote inspection of claim 11, wherein said at least one sensor comprises at least one Hall Effect sensor.

13. The apparatus for remote inspection of claim 12, wherein the out-of-range pressure condition comprises a low-pressure condition, and said at least one detector comprises at least one Hall Effect sensor positioned to detect the low-pressure condition.

14. The apparatus for remote inspection of claim 12, wherein said out-of-range pressure condition comprises a low-pressure condition and a high-pressure condition, and said at least one sensor comprises at least one Hall Effect sensor positioned to detect the low-pressure condition and at least one Hall Effect sensor positioned to detect the high-pressure condition.

15. The apparatus for remote inspection of claim 12, claim 13, or claim 14, wherein said at least one Hall Effect sensor is mounted generally in a plane of said gauge scale.

16. The apparatus for remote inspection of claim 14, wherein said at least one Hall Effect sensor is mounted at a rear surface of said gauge scale.

17. The apparatus for remote inspection of claim 1, wherein the predetermined out-of-range pressure condition comprises a low-pressure condition.

18. The apparatus for remote inspection of claim 1 or claim 5, wherein said out-of-range pressure condition comprises a high-pressure condition.

19. The apparatus for remote inspection of claim 1, wherein said electronic circuit comprises male and female electrical/communication connector elements cooperatively defined between the portable tank and the remote central station.

20. The apparatus for remote inspection of claim 19, further comprising a bracket for mounting the portable tank to a support, said bracket adapted to position the portable tank in an installed position for cooperative mating engagement of said male and female electrical/communication connection elements.

* * * * *

UNITED STATES PATENT AND TRADEMARK OFFICE
CERTIFICATE OF CORRECTION

| | | |
|---|---|---|
| PATENT NO. | : 7,891,241 B2 | Page 1 of 1 |
| APPLICATION NO. | : 12/504315 | |
| DATED | : February 22, 2011 | |
| INVENTOR(S) | : John J. McSheffrey, Jr. et al. | |

It is certified that error appears in the above-identified patent and that said Letters Patent is hereby corrected as shown below:

Column 14, Line 46, "5, wherein said out-of-range pressure condition comprises a" should read
-- 17, wherein said out-of-range pressure condition comprises a --

Signed and Sealed this
Tenth Day of May, 2011

David J. Kappos
*Director of the United States Patent and Trademark Office*